United States Patent
Huang (10) Patent No.: US 11,108,950 B2
(45) Date of Patent: Aug. 31, 2021

(54) METHOD FOR GENERATING BLURRED PHOTOGRAPH, AND STORAGE DEVICE AND MOBILE TERMINAL

(71) Applicant: TCL Communications (Ningbo) Co., Ltd., Ningbo (CN)

(72) Inventor: Shuwei Huang, Ningbo (CN)

(73) Assignee: TCL Communication (Ningbo) Co., Ltd., Ningbo (CN)

( * ) Notice: Subject to any disclaimer, the term of this patent is extended or adjusted under 35 U.S.C. 154(b) by 121 days.

(21) Appl. No.: 16/616,995

(22) PCT Filed: May 25, 2018

(86) PCT No.: PCT/CN2018/088468
§ 371 (c)(1),
(2) Date: Nov. 26, 2019

(87) PCT Pub. No.: WO2018/214967
PCT Pub. Date: Nov. 29, 2018

(65) Prior Publication Data
US 2021/0136281 A1 May 6, 2021

(30) Foreign Application Priority Data
May 26, 2017 (CN) .................. 201710386488.X (51) Int. Cl.
*H04N 5/225* (2006.01)
*H04N 5/232* (2006.01)
(Continued)

(52) U.S. Cl.
CPC ......... *H04N 5/23229* (2013.01); *G06T 5/002* (2013.01); *G06T 5/50* (2013.01); *G06T 7/248* (2017.01)

(58) Field of Classification Search
CPC ............ H04N 5/23229; H04N 5/23212; G06T 7/248; G06T 5/002; G06T 5/50
(Continued)

(56) References Cited

U.S. PATENT DOCUMENTS 8,542,990 B2 9/2013 Sundstrom
2010/0141807 A1* 6/2010 Alon .................. G02B 27/0012
348/241
(Continued)

FOREIGN PATENT DOCUMENTS

CN 101548232 9/2009
CN 103297699 9/2013
(Continued)

OTHER PUBLICATIONS

International Search Report dated Sep. 4, 2018 from the International Searching Authority Re. Application No. PCT/CN2018/088468 with an English Translation. (5 pages).

*Primary Examiner* — Stephen P Coleman (57) ABSTRACT

Provided is a method for generating a blurred photo graph, comprising: receiving a blurring adjustment instruction and determining a blurring adjustment signal trajectory of the blurring adjustment instruction; if the trajectory is a dynamic short change, according to a first blurring mapping signal corresponding to the dynamic forward movement of a target object, obtaining a virtual photographing state and adjusting the target object to be in the virtual photographing state; and if the trajectory is a dynamic long change, according to a second blurring mapping signal corresponding to the dynamic back ward movement of the target object, obtaining a virtual photographing state and adjusting the target object to be in the virtual photographing state.

19 Claims, 4 Drawing Sheets

(51) Int. Cl.
  *G06T 7/246*  (2017.01)
  *G06T 5/00*  (2006.01)
  *G06T 5/50*  (2006.01)

(58) Field of Classification Search
  USPC .................................................. 348/207.99
  See application file for complete search history.

(56) References Cited

U.S. PATENT DOCUMENTS

| | | |
|---|---|---|
| 2011/0134311 A1 | 6/2011 | Nagao |
| 2013/0113962 A1 | 5/2013 | Li |
| 2014/0267418 A1* | 9/2014 | McArdle ............... G06T 19/006 345/633 |
| 2015/0156401 A1 | 6/2015 | Meyer |

FOREIGN PATENT DOCUMENTS

| | | |
|---|---|---|
| CN | 104219445 | 12/2014 |
| CN | 104333700 | 2/2015 |
| CN | 104751407 | 7/2015 |
| CN | 105979165 | 9/2016 |
| CN | 106488160 | 3/2017 |
| CN | 106534675 | 3/2017 |
| CN | 106570821 | 4/2017 |
| CN | 107222676 | 9/2017 |
| WO | WO 2018/214967 | 11/2018 |

* cited by examiner

METHOD FOR GENERATING BLURRED PHOTOGRAPH, AND STORAGE DEVICE AND MOBILE TERMINAL

RELATED APPLICATIONS

This application is a National Phase of PCT Patent Application No. PCT/CN2018/088468 having International filing date of May 25, 2018, which claims the benefit of priority of Chinese Patent Application No. 201710386488.X, filed on May 26, 2017. The contents of the above applications are all incorporated by reference as if fully set forth herein in their entirety.

FIELD AND BACKGROUND OF THE INVENTION

The present disclosure relates to the field of photo processing technology, more particularly, to a method for generating a blurred photo, a storage device and a mobile terminal.

With the continuous development of mobile terminal technology, users are no longer satisfied with the only quality demand of clarity of photos when taking pictures, and the image capturing functions of mobile terminals are required to become increasingly versatile. At present, users can choose to generate photos with blurred backgrounds during the image capturing process. However, this requires the user to select the foreground area in the preview image and set the degree of blur in advance. The user needs a certain learning cost for the image capturing, and the image capturing process is laborious and inefficient.

Therefore, there is a need to further improve the related art.

SUMMARY OF THE INVENTION

Technical Problem

The present disclosure provides a method for generating a blurred photo, a storage device and a mobile terminal to resolve the problem that a blurring process can not be performed on an image to be captured automatically in the related art.

Technical Solution

A first aspect of the embodiments of the present disclosure provides a method of generating blurred photo, performed in a mobile terminal. The method comprising:

receiving a virtual adjustment instruction for a photo to be blurred, and determining whether a blur adjustment signal locus corresponding to the virtual adjustment instruction is a dynamic short change or a dynamic long change;

acquiring a first blur mapping signal corresponding to a dynamic forward movement of a target object in the photo to be blurred if it is determined that the blur adjustment signal locus is the dynamic short change to obtain a final virtual image-capturing state of the target object, and adjusting the target object to the virtual image-capturing state; and acquiring a second blur mapping signal corresponding to a dynamic backward movement of the target object in the photo to be blurred if it is determined that the blur adjustment signal locus is the dynamic long change to obtain the final virtual image-capturing state of the target object, and adjusting the target object to the virtual image-capturing state.

Optionally, before the step of receiving the virtual adjustment instruction for the photo to be blurred, and determining whether the blur adjustment signal locus corresponding to the virtual adjustment instruction is the dynamic short change or the dynamic long change, the instructions are adapted to be loaded and executed by the processor to further perform the following operation:

presetting that if the blur adjustment signal locus is the dynamic short change, the target object in the photo to be blurred is blurred so as to be dynamically highlighted forward, presetting that if the blur adjustment signal locus is the dynamic long change, the target object in the photo to be blurred is blurred so as to be dynamically highlighted backward.

Optionally, before the step of receiving the virtual adjustment instruction for the photo to be blurred, and determining whether the blur adjustment signal locus corresponding to the virtual adjustment instruction is the dynamic short change or the dynamic long change, the instructions are adapted to be loaded and executed by the processor to perform the following step:

generating a first virtual mapping electrical signal and a second virtual mapping electrical signal correspondingly at the same time when the blur adjustment signal locus corresponding to the virtual adjustment instruction is generated respectively based on virtual moving states of moving forward dynamically and moving backward dynamically of the target object.

Optionally, in the step of generating the first virtual mapping electrical signal and the second virtual mapping electrical signal correspondingly at the same time when the blur adjustment signal locus corresponding to the virtual adjustment instruction is generated respectively based on the virtual moving states of moving forward dynamically and moving backward dynamically of the target object, the instructions are adapted to be loaded and executed by the processor to perform the following step:

sequentially outputting the first virtual mapping electrical signal that presents the dynamic short change or the second virtual mapping electrical signal that presents the dynamic long change based on a change of the blue adjustment signal locus.

Optionally, after the step of acquiring the first blur mapping signal corresponding to the dynamic forward movement of the target object in the photo to be blurred to obtain the final virtual image-capturing state of the target object, the instructions are adapted to be loaded and executed by the processor to further perform the following step:

sending a first virtual image-capturing request to a processor, the processor selecting a first virtual image-capturing control signal to control the target object to be adjusted to the virtual image-capturing state so as to perform image capture.

Optionally, after the step of acquiring the second blur mapping signal corresponding to the dynamic backward movement of the target object in the photo to be blurred to obtain the final virtual image-capturing state of the target object, the instructions are adapted to be loaded and executed by the processor to further perform the following step:

sending a second virtual image-capturing request to a processor, the processor selecting a second virtual image-capturing control signal to control the target object to be adjusted to the virtual image-capturing state so as to perform image capture.

Optionally, in the step of sending the first virtual image-capturing request to the processor, the processor selecting the first virtual image-capturing control signal to control the target object to be adjusted to the virtual image-capturing state so as to perform image capture, the instructions are adapted to be loaded and executed by the processor to perform the following step:

the processor selecting and directing the first virtual image-capturing control signal to a camera module of a terminal so as to control the camera module to perform a virtual highlighting image capture on the target object that has been adjusted to the virtual image-capturing state.

Optionally, in the step of sending the second virtual image-capturing request to the processor, the processor selecting the second virtual image-capturing control signal to control the target object to be adjusted to the virtual image-capturing state so as to perform image capture, the instructions are adapted to be loaded and executed by the processor to perform the following step:

the processor selecting and directing the second virtual image-capturing control signal to the camera module of the terminal so as to control the camera module to perform a virtual highlighting image capture on the target object that has been adjusted to the virtual image-capturing state.

A second aspect of the embodiments of the present disclosure provides a storage device stored a plurality of instructions and connected to a camera of a mobile terminal. The plurality of instructions are adapted to be loaded and executed by a processor to perform the following operations:

receiving a virtual adjustment instruction for a photo to be blurred, and determining whether a blur adjustment signal locus corresponding to the virtual adjustment instruction is a dynamic short change or a dynamic long change;

acquiring a first blur mapping signal corresponding to a dynamic forward movement of a target object in the photo to be blurred if it is determined that the blur adjustment signal locus is the dynamic short change to obtain a final virtual image-capturing state of the target object, and adjusting the target object to the virtual image-capturing state; and acquiring a second blur mapping signal corresponding to a dynamic backward movement of the target object in the photo to be blurred if it is determined that the blur adjustment signal locus is the dynamic long change to obtain the final virtual image-capturing state of the target object, and adjusting the target object to the virtual image-capturing state.

A third aspect of the embodiments of the present disclosure provides a mobile terminal. The mobile terminal comprises:

a processor adapted to execute a plurality of instructions, and a storage device communicatively connected to the processor, the storage device being adapted to store the plurality of instructions, the instructions being adapted to be loaded and executed by the processor to perform the following steps:

receiving a virtual adjustment instruction for a photo to be blurred, and determining whether a blur adjustment signal locus corresponding to the virtual adjustment instruction is a dynamic short change or a dynamic long change;

acquiring a first blur mapping signal corresponding to a dynamic forward movement of a target object in the photo to be blurred if it is determined that the blur adjustment signal locus is the dynamic short change to obtain a final virtual image-capturing state of the target object, and adjusting the target object to the virtual image-capturing state; and acquiring a second blur mapping signal corresponding to a dynamic backward movement of the target object in the photo to be blurred if it is determined that the blur adjustment signal locus is the dynamic long change to obtain the final virtual image-capturing state of the target object, and adjusting the target object to the virtual image-capturing state.

Optionally, before the operation of receiving the virtual adjustment instruction for the photo to be blurred, and determining whether the blur adjustment signal locus corresponding to the virtual adjustment instruction is the dynamic short change or the dynamic long change, the instructions are adapted to be loaded and executed by the processor to further perform the following operation:

presetting that if the blur adjustment signal locus is the dynamic short change, the target object in the photo to be blurred is blurred so as to be dynamically highlighted forward, presetting that if the blur adjustment signal locus is the dynamic long change, the target object in the photo to be blurred is blurred so as to be dynamically highlighted backward.

Optionally, before the operation of receiving the virtual adjustment instruction for the photo to be blurred, and determining whether the blur adjustment signal locus corresponding to the virtual adjustment instruction is the dynamic short change or the dynamic long change, the instructions are adapted to be loaded and executed by the processor to perform the following operation:

generating a first virtual mapping electrical signal and a second virtual mapping electrical signal correspondingly at the same time when the blur adjustment signal locus corresponding to the virtual adjustment instruction is generated respectively based on virtual moving states of moving forward dynamically and moving backward dynamically of the target object.

Optionally, in the operation of generating the first virtual mapping electrical signal and the second virtual mapping electrical signal correspondingly at the same time when the blur adjustment signal locus corresponding to the virtual adjustment instruction is generated respectively based on the virtual moving states of moving forward dynamically and moving backward dynamically of the target object, the instructions are adapted to be loaded and executed by the processor to perform the following operation:

sequentially outputting the first virtual mapping electrical signal that presents the dynamic short change or the second virtual mapping electrical signal that presents the dynamic long change based on a change of the blue adjustment signal locus.

Optionally, after the operation of acquiring the first blur mapping signal corresponding to the dynamic forward movement of the target object in the photo to be blurred to obtain the final virtual image-capturing state of the target object, the instructions are adapted to be loaded and executed by the processor to further perform the following operation:

sending a first virtual image-capturing request to a processor, the processor selecting a first virtual image-capturing control signal to control the target object to be adjusted to the virtual image-capturing state so as to perform image capture.

Optionally, after the operation of acquiring the second blur mapping signal corresponding to the dynamic backward movement of the target object in the photo to be blurred to obtain the final virtual image-capturing state of the target object, the instructions are adapted to be loaded and executed by the processor to further perform the following operation:

sending a second virtual image-capturing request to a processor, the processor selecting a second virtual image-capturing control signal to control the target object to be adjusted to the virtual image-capturing state so as to perform image capture.

Optionally, in the operation of sending the first virtual image-capturing request to the processor, the processor selecting the first virtual image-capturing control signal to control the target object to be adjusted to the virtual image-capturing state so as to perform image capture, the instructions are adapted to be loaded and executed by the processor to perform the following operation:

the processor selecting and directing the first virtual image-capturing control signal to a camera module of a terminal so as to control the camera module to perform a virtual highlighting image capture on the target object that has been adjusted to the virtual image-capturing state.

Optionally, in the operation of sending the second virtual image-capturing request to the processor, the processor selecting the second virtual image-capturing control signal to control the target object to be adjusted to the virtual image-capturing state so as to perform image capture, the instructions are adapted to be loaded and executed by the processor to perform the following operation:

the processor selecting and directing the second virtual image-capturing control signal to the camera module of the terminal so as to control the camera module to perform a virtual highlighting image capture on the target object that has been adjusted to the virtual image-capturing state.

Optionally, in the operation of acquiring the first blur mapping signal corresponding to the dynamic forward movement of the target object in the photo to be blurred if it is determined that the blur adjustment signal locus is the dynamic short change to obtain the final virtual image-capturing state of the target object, the instructions are adapted to be loaded and executed by the processor to perform the following operation:

determining that the photographed target object moves forward dynamically when the blur adjustment signal locus is the dynamic short change, each time the target object moving, a virtual mapping electrical signal mapping a current virtual state of the photographed target object in sequence, until the photographed target object dynamically moves forward N times to achieve the final virtual image-capturing state.

Optionally, in the operation of acquiring the second blur mapping signal corresponding to the dynamic backward movement of the target object in the photo to be blurred if it is determined that the blur adjustment signal locus is the dynamic long change to obtain the final virtual image-capturing state of the target object, the instructions are adapted to be loaded and executed by the processor to perform the following operation:

determining that the photographed target object moves backward dynamically when the blur adjustment signal locus is the dynamic long change, each time the target object moving, a virtual mapping electrical signal mapping a current virtual state of the photographed target object in sequence, until the photographed target object dynamically moves backward N times to achieve the final virtual image-capturing state.

Advantageous Effect

The present disclosure provides a mobile terminal for blurring a photo. The virtual adjustment instruction for the photo to be blurred is received, and whether the blur adjustment signal locus corresponding to the virtual adjustment instruction is the dynamic short change or the dynamic long change is determined. If it is determined that the blur adjustment signal locus is the dynamic short change, the final virtual image-capturing state of the target object is obtained based on the first blur mapping signal corresponding to the dynamic forward movement of the target object, and the target object is adjusted to the virtual image-capturing state. If it is determined that the blur adjustment signal locus is the dynamic long change, the final virtual image-capturing state of the target object is obtained based on the second blur mapping signal corresponding to the dynamic backward movement of the target object, and the target object is adjusted to the virtual image-capturing state. The method for generating the blurred photo according to the present disclosure highlights and blurs the target object in the photo, so that the image is more beautiful, thus satisfying the user with more intelligent image capturing to fulfill the requirement of more image capturing functions.

DESCRIPTION OF SPECIFIC EMBODIMENTS OF THE INVENTION

For the purpose of description rather than limitation, the following provides such specific details as a specific system structure, interface, and technology for a thorough understanding of the application. However, it is understandable by persons skilled in the art that the application can also be implemented in other embodiments not providing such specific details. In other cases, details of a well-known apparatus, circuit and method are omitted to avoid hindering the description of the application by unnecessary details.

Figure 1:
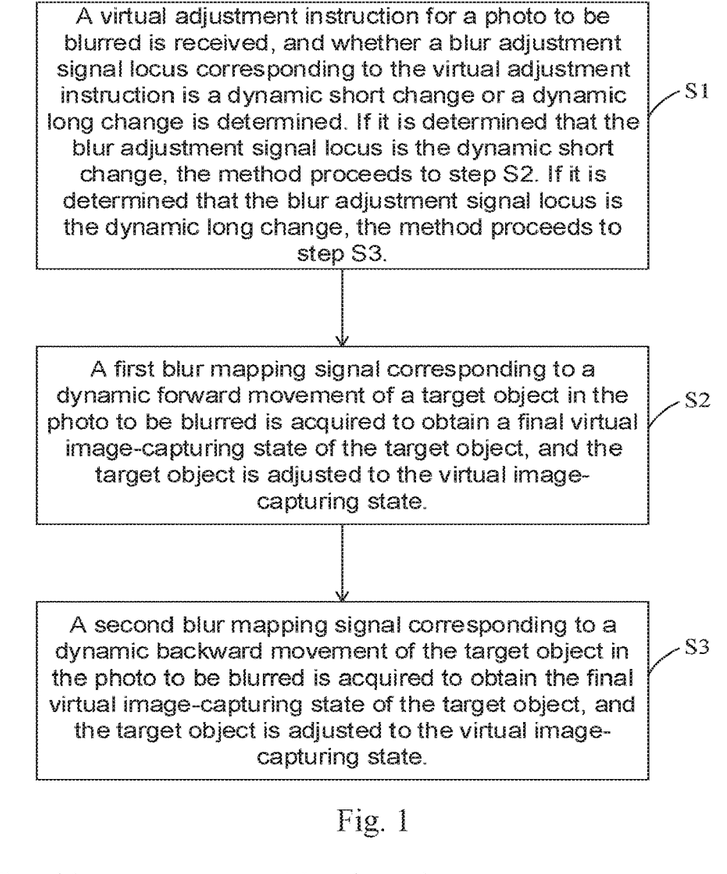
FIG. 1 is a flowchart of steps of a method for generating a blurred photo according to a one embodiment of the present disclosure.

The present disclosure provides a method for generating a blurred image adapted to be executed in a smart terminal with an image-capturing device. As shown in FIG. 1, the method comprises the steps as follows.

Step S1: A virtual adjustment instruction for a photo to be blurred is received, and whether a blur adjustment signal locus corresponding to the virtual adjustment instruction is a dynamic short change or a dynamic long change is determined. If it is determined that the blur adjustment signal locus is the dynamic short change, the method proceeds to step S2. If it is determined that the blur adjustment signal locus is the dynamic long change, the method proceeds to step S3.

After a camera acquires the photo to be blurred (the photo to be blurred may be captured by the camera, or may be a local photo acquired from the smart terminal), the virtual adjustment instruction sent to a user or the virtual adjustment instruction that is automatically sent to the photo to be blurred after the photo to be blurred is acquired preset by a system is received.

After receiving the virtual adjustment instruction, whether the blur adjustment signal locus corresponding to the virtual adjustment instruction is the dynamic short change or the dynamic long change is determined. If it is determined that the blur adjustment signal locus is the dynamic short change, the method proceeds to step S2. If it is determined that the blur adjustment signal locus is the dynamic long change, the method proceeds to step S3.

Step S2: A first blur mapping signal corresponding to a dynamic forward movement of a target object in the photo to be blurred is acquired to obtain a final virtual image-capturing state of the target object, and the target object is adjusted to the virtual image-capturing state.

A virtual adjustment signal is output at the same time as the virtual adjustment instruction is sent. A photography target virtual mapping unit synchronously outputs a virtual mapping electrical signal while the virtual adjustment signal is sent. The output of the virtual mapping electrical signal is synchronized with the sending of the virtual adjustment signal. An adjusted virtual state required by the target object is acquired based on the virtual mapping electrical signal, and the photo to be blurred is adjusted according to the virtual state. After a blurring process is performed on the photo to be blurred, the target object is highlighted.

When the blur adjustment signal locus is the dynamic short change, it is determined that the photographed target object moves forward dynamically. Each time the target object moves, the virtual mapping electrical signal maps a current virtual state of the photographed target object in sequence, until the photographed target object dynamically moves forward N times. As a result, the final virtual image-capturing state is achieved.

Step S3: A second blur mapping signal corresponding to a dynamic backward movement of the target object in the photo to be blurred is acquired to obtain the final virtual image-capturing state of the target object, and the target object is adjusted to the virtual image-capturing state.

When the blur adjustment signal locus is the dynamic long change, it is determined that the photographed target object moves backward dynamically. Each time the target object moves, the virtual mapping electrical signal maps the current virtual state of the photographed target object in sequence, until the photographed target object dynamically moves backward N times. As a result, the final virtual image-capturing state is achieved.

The adjustment of the target object to the virtual image-capturing state is to virtually highlight the target object in the photo.

In order to control the steps for blurring a photo so as to realize the forward blurring or the backward blurring of the target object in the photo, the method further comprises the following step before step S1:

Step S0: It is preset that if the blur adjustment signal locus is the dynamic short change, the target object in the photo to be blurred is blurred so as to be dynamically highlighted forward. It is preset that if the blur adjustment signal locus is the dynamic long change, the target object in the photo to be blurred is blurred so as to be dynamically highlighted backward.

In order to perform the blurring process on the photo according to the received virtual adjustment instruction more accurately, step S1 comprises:

Step S11: A first virtual mapping electrical signal and a second virtual mapping electrical signal are generated correspondingly at the same time when the blur adjustment signal locus corresponding to the virtual adjustment instruction is generated respectively based on virtual moving states of moving forward dynamically and moving backward dynamically of the target object. In greater detail, the virtual mapping electric signal is sent by using a preset virtual mapping unit to sequentially output the first virtual mapping electrical signal that presents the dynamic short change or the second virtual mapping electrical signal that presents the dynamic long change based on a change of the blur adjustment signal locus.

After the step of obtaining the final virtual image-capturing state of the target object, step S2 further comprises:

Step S21: A first virtual image-capturing request is sent to a processor. The processor selects a first virtual image-capturing control signal to control the target object to be adjusted to the virtual image-capturing state.

After the step of obtaining the final virtual image-capturing state of the target object, step S3 further comprises:

Step S31: A second virtual image-capturing request is sent to the processor. The processor selects a second virtual image-capturing control signal to control the target object to be adjusted to the virtual image-capturing state.

Step S21 further comprises:

Step S211: The processor selects and directs the first virtual image-capturing control signal to a camera module of a terminal so as to control the camera module to perform a virtual highlighting image capture on the target object that has been adjusted to the virtual image-capturing state.

Step S31 further comprises:

Step S311: The processor selects and directs the second virtual image-capturing control signal to the camera module of the terminal so as to control the camera module to perform a virtual highlighting image capture on the target object that has been adjusted to the virtual image-capturing state.

The method for generating the blurred photo according to the present disclosure is described in more detail below with reference to specific application embodiment of the present disclosure.

S100: An image-capturing virtual processing module is disposed in a terminal or an image-capturing device in advance. The image-capturing virtual processing module virtually processes a photography target into a virtual image-capturing state. A description is provided with reference to FIG. 2. A photography target virtual adjustment unit is disposed in the image-capturing virtual processing module. The photography target virtual adjustment unit virtually adjusts the photography target to move forward or backward dynamically. The photography target virtual adjustment unit outputs a blur adjustment signal locus, and the blur adjustment signal locus controls the photography target to move forward or backward dynamically. Whether the photography target dynamically moves forward or dynamically moves backward is determined through an output state of the blur adjustment signal locus.

Figure 2:
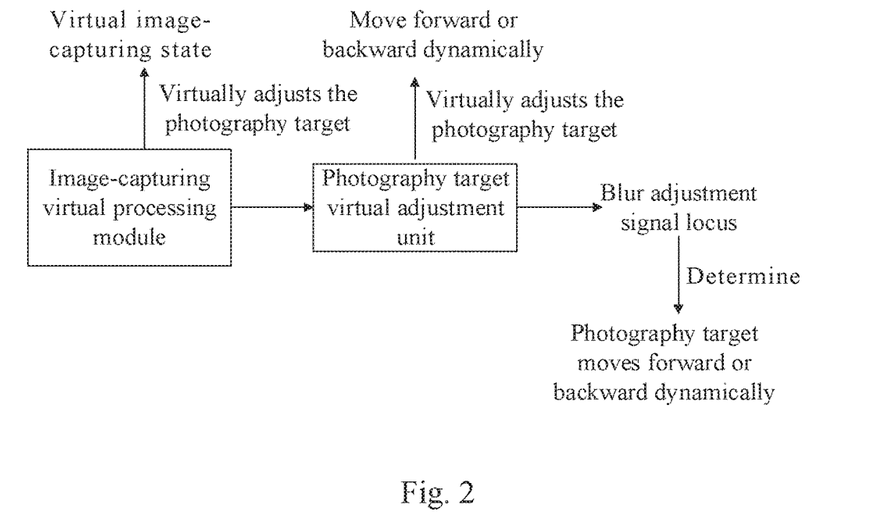
FIG. 2 is a schematic diagram of the principle of determining whether a photography target moves forward dynamically or moves backward dynamically in a method for generating a blurred photo according to one embodiment of the present disclosure.

S200: The dynamic forward movement of the photography target is to virtually and dynamically adjust the photography target to move forward so as to make the photography target reach an ideal image-capturing state. When an output of the blur adjustment signal locus presents the dynamic short change, the photography target moves forward dynamically. Then, when the photography target moves forward n times dynamically, the blur adjustment signal locus gradually becomes shorter.

The dynamic backward movement of the photography target is to virtually and dynamically adjust the photography target to move backward so as to make the photography target reach the ideal image-capturing state. When the output of the blur adjustment signal locus presents the dynamic long change, the photography target moves backward dynamically. Then, when the photography target moves backward n times dynamically, the blur adjustment signal locus gradually becomes longer.

S300: When the blur adjustment signal locus output by the photography target virtual adjustment unit presents the dynamic short change, the photography target virtually moves forward dynamically. A description is provided with reference to FIG. 3. If the photography target virtually moves forward dynamically one time, a photography target virtual mapping unit in the image-capturing virtual processing module virtually maps the photography target to a current virtual state 11. The photography target virtual mapping unit outputs n virtual mapping electric signals, that is, a virtual mapping electric signal 1, a virtual mapping electric signal 2 . . . , a virtual mapping electric signal (n). The virtual mapping electric signal 1, the virtual mapping electric signal 2 . . . , the virtual mapping electric signal (n) map the photography target to the current virtual state 11. If the photography target virtually moves forward dynamically two times, the virtual mapping electric signal 1, the virtual mapping electric signal 2 . . . , the virtual mapping electric signal (n) output by the photography target virtual mapping unit map the photography target to a current virtual state 12. If the photography target virtually moves forward dynamically n times, the virtual mapping electric signal 1, the virtual mapping electric signal 2 . . . , the virtual mapping electric signal (n) output by the photography target virtual mapping unit map the photography target to a current virtual state (1n).

Figure 4:
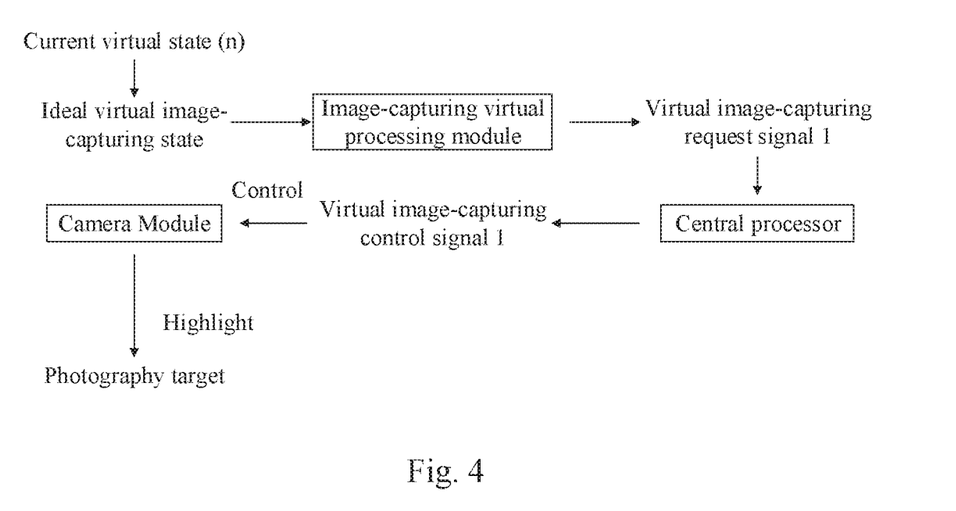
FIG. 4 is schematic diagram of the principle of controlling a photography target to be highlighted when the photography target moves forward dynamically in a method for generating a blurred photo according to one embodiment of the present disclosure.

A description is provided with reference to FIG. 4. If the photography target reaches an ideal virtual image-capturing state when the photography target moves forward to the current virtual state (n), the image-capturing virtual processing module sends a virtual image-capturing request signal 1 to a processor. The processor outputs a virtual image-capturing control signal 1 to a smart mobile terminal and a camera module of a tablet according to the virtual image-capturing request signal 1, and the camera module captures and highlights the photography target.

Figure 5:
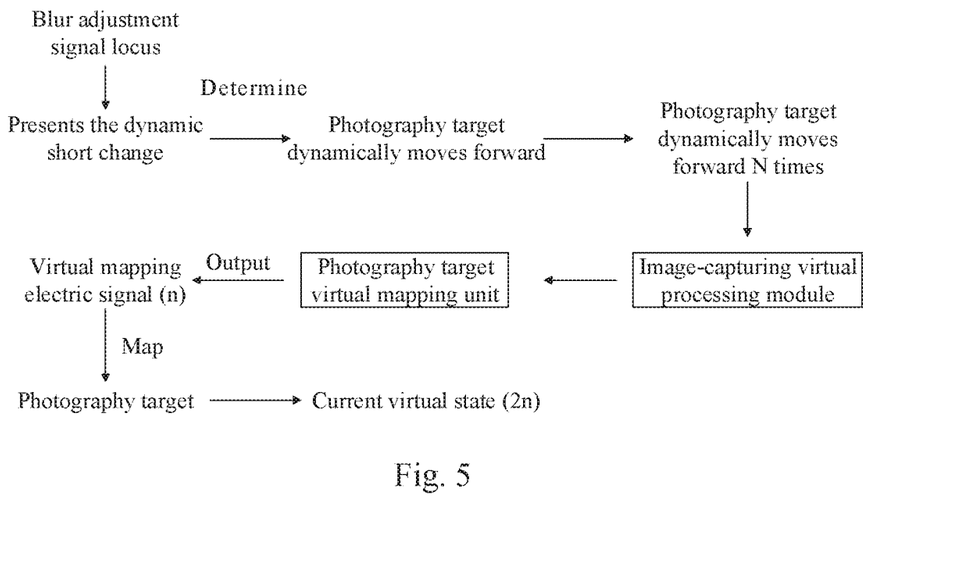
FIG. 5 is a schematic diagram of the principle of obtaining a final virtual image-capturing state when a photography target moves backward dynamically in a method for generating a blurred photo according to one embodiment of the present disclosure.

S400: When the blur adjustment signal locus output by the photography target virtual adjustment unit presents the dynamic long change, the photography target virtually moves backward dynamically. A description is provided with reference to FIG. 5. If the photography target virtually moves backward dynamically one time, the virtual mapping electric signal 1, the virtual mapping electric signal 2 . . . , the virtual mapping electric signal (n) output by the photography target virtual mapping unit map the photography target to a current virtual state 21. If the photography target virtually moves backward dynamically two times, the virtual mapping electric signal 1, the virtual mapping electric signal 2 . . . , the virtual mapping electric signal (n) output by the photography target virtual mapping unit map the photography target to a current virtual state 22. If the photography target virtually moves backward dynamically n times, the virtual mapping electric signal 1, the virtual mapping electric signal 2 . . . , the virtual mapping electric signal (n) output by the photography target virtual mapping unit map the photography target to a current virtual state (2n).

Figure 6:
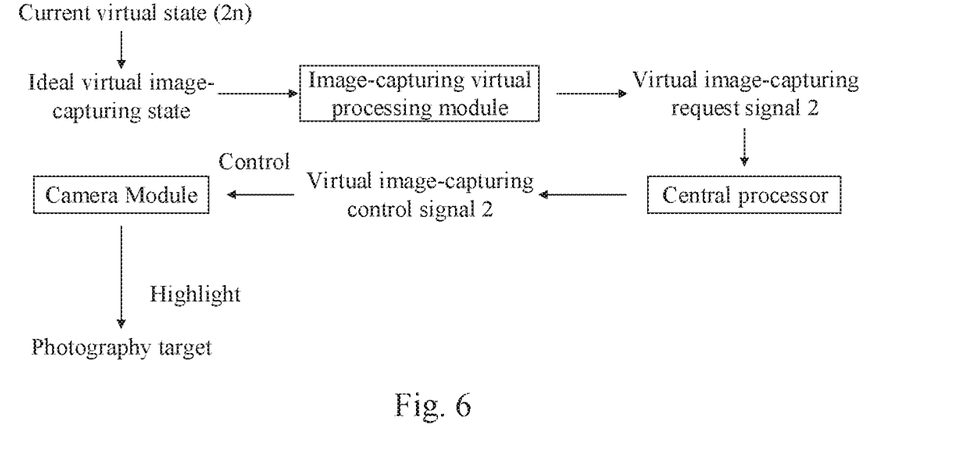
FIG. 6 is schematic diagram of the principle of controlling a photography target to be highlighted when the photography target moves backward dynamically in a method for generating a blurred photo according to one embodiment of the present disclosure.

A description is provided with reference to FIG. 6. If the photography target reaches the ideal virtual image-capturing state when the photography target moves backward to the current virtual state (2n), the image-capturing virtual processing module sends a virtual image-capturing request signal 2 to the processor. The processor outputs a virtual image-capturing control signal 2 to the smart mobile terminal and the camera module of the tablet according to the virtual image-capturing request signal 2, and the camera module captures and highlights the photography target.

The present disclosure further provides a storage device, in which a plurality of instructions are stored, connected to a camera device of a smart terminal. The instructions are adapted to be loaded and executed by a processor to implement the method for generating the blurred photo.

One person of ordinary skill in the art would understand that all or part of the steps of the various methods of the foregoing embodiments may be performed by a program to instruct relevant hardware. The program may be stored in a computer readable storage device, and the storage device may comprise a read only memory (ROM), a random access memory (RAM), a magnetic disk, or an optical disc, etc.

The present disclosure further provides a mobile terminal. The mobile terminal further comprises:

a processor adapted to execute a plurality of instructions; and a storage device adapted to store the plurality of instructions, the instructions adapted to be loaded and executed by the processor to perform the method for generating the blurred photo.

Figure 7:
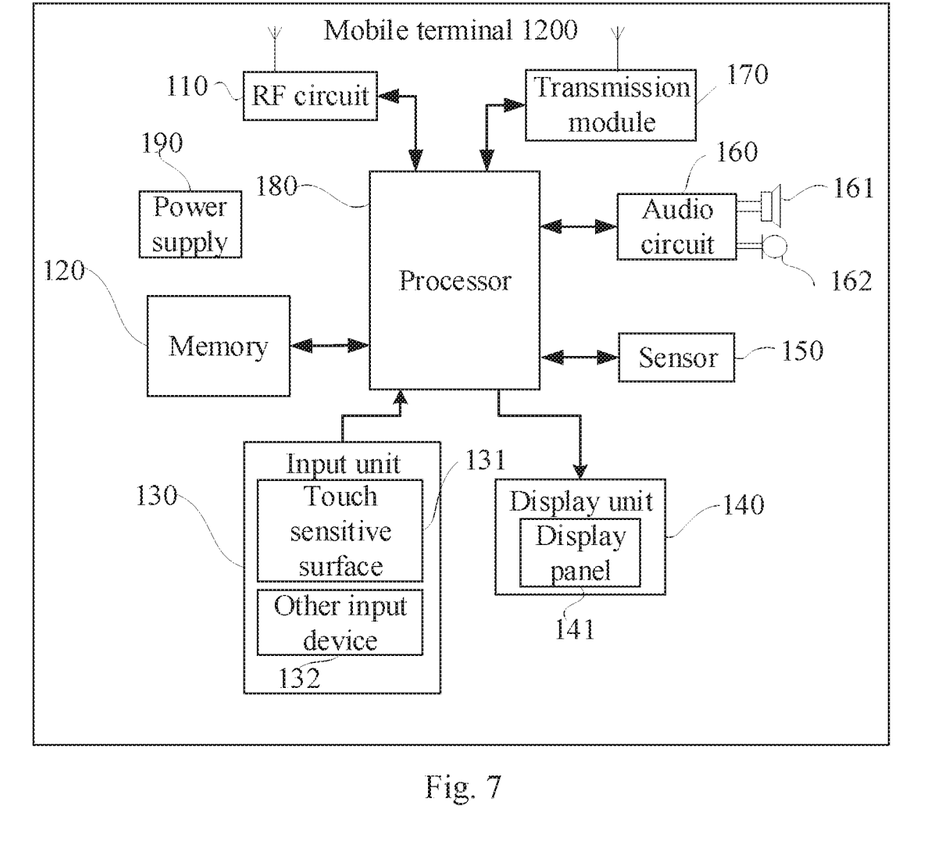
FIG. 7 is a schematic diagram of a structure of a mobile terminal according to one embodiment of the present disclosure.

FIG. 7 is a block diagram of a detailed structure of a mobile terminal according to one embodiment of the present disclosure. The mobile terminal can be configured to perform the method for generating the blurred photo provided by the above embodiments. The mobile terminal 1200 may be a smart phone or a tablet computer.

As shown in FIG. 7, the mobile terminal 1200 may comprise components, such as a radio frequency (RF) circuit 110, a memory 120 including one or more (only one is shown in the figure) computer-readable storage media, an input unit 130, a display unit 140, a sensor 150, an audio circuit 160, a transmission module 170, a processor 180 including one or more (only one is shown in the figure) processing cores, and a power supply 190, etc. Those skilled in the art would understand that the mobile terminal 1200 is not limited to the structure of the mobile terminal 1200 shown in FIG. 7. The mobile terminal 1200 may comprise more or less components than those illustrated in the figure, or some components may be combined, or may have different components arrangements.

The RF circuit 110 may be configured to receive and send a signal during an information receiving and sending process or a conversation process. Specifically, after receiving downlink information from a base station, the RF circuit 110 delivers the downlink information to one or more processors 180 for processing, and sends related uplink data to the base station. Generally, the RF circuit 110 includes, but is not limited to, an antenna, at least one amplifier, a tuner, one or more oscillators, a subscriber identity module (SIM) card, a transceiver, a coupler, a low noise amplifier (LNA), and a duplexer. In addition, the RF circuit 110 may also communicate with a network and another device by wireless communication. The wireless communication may use any communications standard or protocol, which includes, but is not limited to, a Global System for Mobile communications (GSM), an Enhanced Data GSM Environment (EDGE), a Wideband Code Division Multiple Access (WCDMA), a Code Division Access (CDMA), a Time Division Multiple Access (TDMA), a Wireless Fidelity (Wi-Fi) such as IEEE 802.11a, IEEE 802.11b, IEEE802.11g and IEEE 802.11n, a Voice over Internet Protocol (VoIP), a Worldwide Interoperability for Microwave Access (Wi-Max), any other protocols for e-mail, instant communication and short message, and the like.

The memory 120 may be configured to store a software program and module. The processor 180 runs the software program and module stored in the memory 120, to implement various functional applications and data processing. The memory 120 may mainly include a program storage area and a data storage area. The program storage area may store an operating system, an application program required by at least one function (such as a sound playback function and an image display function), and the like. The data storage area may store data (such as audio data and an address book) created according to use of the terminal 1200, and the like. In addition, the memory 120 may include a high speed random access memory, and may also include a non-volatile memory, such as at least one magnetic disk storage device, a flash memory device, or another volatile solid-state storage device. Correspondingly, the memory 120 may further include a memory controller, so that the processor 180 and the input unit 130 access the memory 120.

The input unit 130 may be configured to receive input digit or character information, and generate keyboard, mouse, joystick, optical, or track ball signal input related to the user setting and function control. Specifically, the input unit 130 may include a touch-sensitive surface 131 and other input device 132. The touch-sensitive surface 131 may also be referred to as a touch screen or a touch panel, and may collect a touch operation of a user on or near the touch-sensitive surface (such as an operation of a user on or near the touch-sensitive surface 131 by using any suitable object or attachment, such as a finger or a stylus), and drive a corresponding connection apparatus according to a preset program. Optionally, the touch-sensitive surface 131 may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and sends the touch point coordinates to the processor 180. Moreover, the touch controller can receive and execute a command sent from the processor 180. In addition, the touch-sensitive surface 131 may be implemented by using various types, such as a resistive type, a capacitance type, an infrared type, and a surface sound wave type. In addition to the touch-sensitive surface 131, the input unit 130 may further include the another input device 132. Specifically, the another input device 132 may include, but is not limited to, one or more of a physical keyboard, a functional key (such as a volume control key or a switch key), a track ball, a mouse, and a joystick.

The display unit 140 may be configured to display information input by the user or information provided for the user, and various graphical user ports of the terminal 1200. The graphical user ports may be formed by a graph, a text, an icon, a video, and any combination thereof. The display unit 140 may include a display panel 141. Optionally, the display panel 141 may be configured by using a liquid crystal display (LCD), an organic light-emitting diode (OLED), or the like. Further, the touch-sensitive surface 131 may cover the display panel 141. After detecting a touch operation on or near the touch-sensitive surface 131, the touch-sensitive surface 131 transfers the touch operation to the processor 180, so as to determine a type of a touch event. Then, the processor 180 provides corresponding visual output on the display panel 141 according to the type of the touch event. Although, in FIG. 7, the touch-sensitive surface 131 and the display panel 141 are used as two separate parts to implement input and output functions, in some embodiments, the touch-sensitive surface 131 and the display panel 141 may be integrated to implement the input and output functions.

The terminal 1200 may further include at least one sensor 150, such as an optical sensor, a motion sensor, and other sensors. Specifically, the optical sensor may include an ambient light sensor and a proximity sensor. The ambient light sensor may adjust luminance of the display panel 141 according to brightness of the ambient light. The proximity sensor may switch off the display panel 141 and/or backlight when the terminal 1200 is moved to the ear. As one type of motion sensor, a gravity acceleration sensor may detect magnitude of accelerations at various directions (which generally are triaxial), may detect magnitude and a direction of the gravity when static, and may be configured to identify an application of a mobile phone attitude (such as switching between horizontal and vertical screens, a related game, and attitude calibration of a magnetometer), a related function of vibration identification (such as a pedometer and a knock). Other sensors, such as a gyroscope, a barometer, a hygrometer, a thermometer, and an infrared sensor, which may be configured in the terminal 1200 are not further described herein.

The audio circuit 160, a loudspeaker 161, and a microphone 162 may provide audio interfaces between the user and the terminal 1200. The audio circuit 160 may transmit, to the loudspeaker 161, a received electric signal converted from received audio data. The loudspeaker 161 converts the electric signal into a sound signal for output. On the other hand, the microphone 162 converts a collected sound signal into an electric signal. The audio circuit 160 receives the electric signal and converts the electric signal into audio data, and outputs the audio data to the processor 180 for processing. Then, the processor 180 sends the audio data to, for example, another terminal by using the RF circuit 110, or outputs the audio data to the memory 120 for further processing. The audio circuit 160 may further include an earplug jack, so as to provide communication between a peripheral earphone and the terminal 1200.

Figure 3:
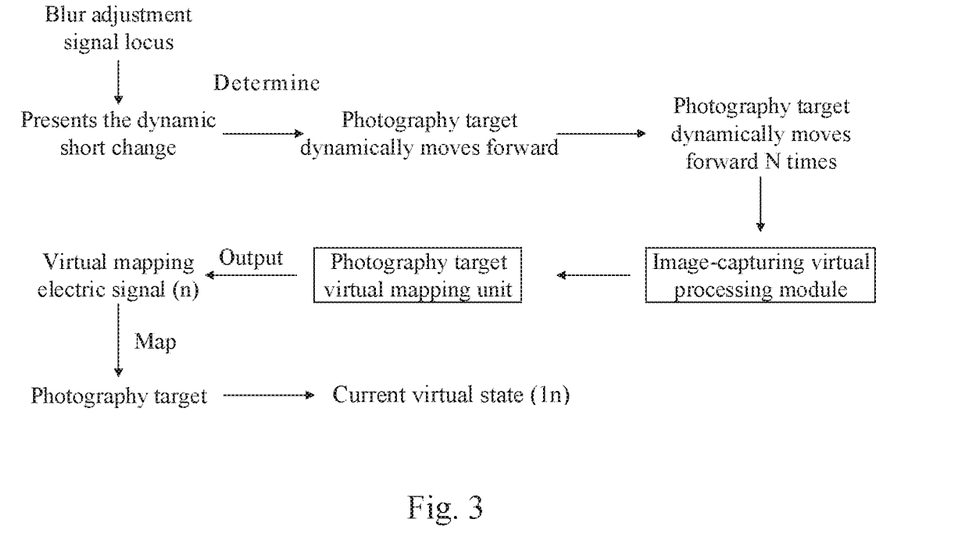
FIG. 3 is a schematic diagram of the principle of obtaining a final virtual image-capturing state when a photography target moves forward dynamically in a method for generating a blurred photo according to one embodiment of the present disclosure.

The terminal 1200 may help, by using the transmission module 170 (e.g. Wi-Fi module), a user to receive and send an e-mail, browse a webpage, and access stream media, and the like, which provides wireless broadband Internet access for the user. Although FIG. 3 shows the transmission module 170, it may be understood that, the wireless communications unit is not a necessary component of the terminal 1200, and can be ignored according to demands without changing the scope of the essence of the present disclosure.

The processor 180 is a control center of the terminal 1200, and connects various parts of the terminal by using various interfaces and lines. By running or executing the software program and/or module stored in the memory 120, and invoking data stored in the memory 120, the processor 180 performs various functions and data processing of the terminal 1200, thereby performing overall monitoring on the mobile phone. Optionally, the processor 180 may include one or more processing cores. Preferably, the processor 180 may integrate an application processor and a modem. The application processor mainly processes an operating system, a user interface, an application program, and the like. The modem mainly processes wireless communication. It may be understood that, the foregoing modem may not be integrated into the processor 180.

The terminal 1200 further includes the power supply 190 (such as a battery) for supplying power to the components. Preferably, the power supply may be logically connected to the processor 180 by using a power supply management system, thereby implementing functions, such as charging, discharging, and power consumption management, by using the power supply management system. The power supply 190 may further include any component, such as one or more direct current or alternate current power supplies, a re-charging system, a power supply fault detection circuit, a power supply converter or an inverter, and a power supply state indicator.

Although not shown in the figure, the terminal 1200 may further include a camera (a front camera or a rear camera), a Bluetooth module, and the like, which are not further described herein. Specifically, in this embodiment, the display unit of the terminal 1200 is a touch screen display, and the terminal 1200 further includes a memory and one or more programs. The one or more programs are stored in the memory and configured to be executed by one or more processors. The one or more programs contain instructions used for performing the operations as follows:

receiving a virtual adjustment instruction for a photo to be blurred, and determining whether a blur adjustment signal locus corresponding to the virtual adjustment instruction is a dynamic short change or a dynamic long change;

acquiring a first blur mapping signal corresponding to a dynamic forward movement of a target object in the photo to be blurred if it is determined that the blur adjustment signal locus is the dynamic short change to obtain a final virtual image-capturing state of the target object, and adjusting the target object to the virtual image-capturing state; and acquiring a second blur mapping signal corresponding to a dynamic backward movement of the target object in the photo to be blurred if it is determined that the blur adjustment signal locus is the dynamic long change to obtain the final virtual image-capturing state of the target object, and adjusting the target object to the virtual image-capturing state.

Before the step of receiving the virtual adjustment instruction for the photo to be blurred, and determining whether the blur adjustment signal locus corresponding to the virtual adjustment instruction is the dynamic short change or the dynamic long change, the instructions are adapted to be loaded and executed by the processor to further perform the following operation:

presetting that if the blur adjustment signal locus is the dynamic short change, the target object in the photo to be blurred is blurred so as to be dynamically highlighted forward, presetting that if the blur adjustment signal locus is the dynamic long change, the target object in the photo to be blurred is blurred so as to be dynamically highlighted backward.

Before the step of receiving the virtual adjustment instruction for the photo to be blurred, and determining whether the blur adjustment signal locus corresponding to the virtual adjustment instruction is the dynamic short change or the dynamic long change, the instructions are adapted to be loaded and executed by the processor to perform the following step:

generating a first virtual mapping electrical signal and a second virtual mapping electrical signal correspondingly at the same time when the blur adjustment signal locus corresponding to the virtual adjustment instruction is generated respectively based on virtual moving states of moving forward dynamically and moving backward dynamically of the target object.

In the step of generating the first virtual mapping electrical signal and the second virtual mapping electrical signal correspondingly at the same time when the blur adjustment signal locus corresponding to the virtual adjustment instruction is generated respectively based on the virtual moving states of moving forward dynamically and moving backward dynamically of the target object, the instructions are adapted to be loaded and executed by the processor to perform the following step:

sequentially outputting the first virtual mapping electrical signal that presents the dynamic short change or the second virtual mapping electrical signal that presents the dynamic long change based on a change of the blue adjustment signal locus.

After the step of acquiring the first blur mapping signal corresponding to the dynamic forward movement of the target object in the photo to be blurred to obtain the final virtual image-capturing state of the target object, the instructions are adapted to be loaded and executed by the processor to further perform the following step:

sending a first virtual image-capturing request to a processor, the processor selecting a first virtual image-capturing control signal to control the target object to be adjusted to the virtual image-capturing state so as to perform image capture.

After the step of acquiring the second blur mapping signal corresponding to the dynamic backward movement of the target object in the photo to be blurred to obtain the final virtual image-capturing state of the target object, the instructions are adapted to be loaded and executed by the processor to further perform the following step:

sending a second virtual image-capturing request to a processor, the processor selecting a second virtual image-capturing control signal to control the target object to be adjusted to the virtual image-capturing state so as to perform image capture.

In the step of sending the first virtual image-capturing request to the processor, the processor selecting the first virtual image-capturing control signal to control the target object to be adjusted to the virtual image-capturing state so as to perform image capture, the instructions are adapted to be loaded and executed by the processor to perform the following step:

the processor selecting and directing the first virtual image-capturing control signal to a camera module of a terminal so as to control the camera module to perform a virtual highlighting image capture on the target object that has been adjusted to the virtual image-capturing state.

In the step of sending the second virtual image-capturing request to the processor, the processor selecting the second virtual image-capturing control signal to control the target object to be adjusted to the virtual image-capturing state so as to perform image capture, the instructions are adapted to be loaded and executed by the processor to perform the following step:

the processor selecting and directing the second virtual image-capturing control signal to the camera module of the terminal so as to control the camera module to perform a virtual highlighting image capture on the target object that has been adjusted to the virtual image-capturing state.

In the operation of acquiring the first blur mapping signal corresponding to the dynamic forward movement of the target object in the photo to be blurred if it is determined that the blur adjustment signal locus is the dynamic short change to obtain the final virtual image-capturing state of the target object, the instructions are adapted to be loaded and executed by the processor to perform the following operation:

determining that the photographed target object moves forward dynamically when the blur adjustment signal locus is the dynamic short change, each time the target object moving, a virtual mapping electrical signal mapping a current virtual state of the photographed target object in sequence, until the photographed target object dynamically moves forward N times to achieve the final virtual image-capturing state.

In the operation of acquiring the second blur mapping signal corresponding to the dynamic backward movement of the target object in the photo to be blurred if it is determined that the blur adjustment signal locus is the dynamic long change to obtain the final virtual image-capturing state of the target object, the instructions are adapted to be loaded and executed by the processor to perform the following operation:

determining that the photographed target object moves backward dynamically when the blur adjustment signal locus is the dynamic long change, each time the target object moving, a virtual mapping electrical signal mapping a current virtual state of the photographed target object in sequence, until the photographed target object dynamically moves backward N times to achieve the final virtual image-capturing state.

The present disclosure provides a mobile terminal for blurring a photo. The virtual adjustment instruction for the photo to be blurred is received, and whether the blur adjustment signal locus corresponding to the virtual adjustment instruction is the dynamic forward movement of the target object or the dynamic backward movement of the target object is determined. If it is determined that the blur adjustment signal locus is the dynamic forward movement of the target object, the final virtual image-capturing state of the target object is obtained based on the first blur mapping signal corresponding to the dynamic forward movement of the target object, and the target object is adjusted to the virtual image-capturing state. If it is determined that the blur adjustment signal locus is the dynamic forward movement of the target object, the final virtual image-capturing state of the target object is obtained based on the second blur mapping signal corresponding to the dynamic backward movement of the target object, and the target object is adjusted to the virtual image-capturing state. The method for generating the blurred photo according to the present disclosure highlights and blurs the target object in the photo, so that the image is more beautiful, thus satisfying the user with more intelligent image capturing to fulfill the requirement of more image capturing functions.

Above are embodiments of the present invention, which does not limit the scope of the present invention. Any modifications, equivalent replacements or improvements within the spirit and principles of the embodiment described above should be covered by the protected scope of the invention.

The present disclosure provides a mobile terminal for blurring a photo. The virtual adjustment instruction for the photo to be blurred is received, and whether the blur adjustment signal locus corresponding to the virtual adjustment instruction is the dynamic short change or the dynamic long change is determined. If it is determined that the blur adjustment signal locus is the dynamic short change, the final virtual image-capturing state of the target object is obtained based on the first blur mapping signal corresponding to the dynamic forward movement of the target object, and the target object is adjusted to the virtual image-capturing state. If it is determined that the blur adjustment signal locus is the dynamic long change, the final virtual image-capturing state of the target object is obtained based on the second blur mapping signal corresponding to the dynamic backward movement of the target object, and the target object is adjusted to the virtual image-capturing state. The method for generating the blurred photo according to the present disclosure highlights and blurs the target object in the photo, so that the image is more beautiful, thus satisfying the user with more intelligent image capturing to fulfill the requirement of more image capturing functions.

The present disclosure is described in detail in accordance with the above contents with the specific preferred examples. However, this present disclosure is not limited to the specific examples. For the ordinary technical personnel of the technical field of the present disclosure, on the premise of keeping the conception of the present disclosure, the technical personnel can also make simple deductions or replacements, and all of which should be considered to belong to the protection scope of the present disclosure.

What is claimed is:

1. A method of generating blurred photo, performed in a mobile terminal, the method comprising:

receiving a virtual adjustment instruction for a photo to be blurred, and determining whether a blur adjustment signal locus corresponding to the virtual adjustment instruction is a dynamic short change or a dynamic long change;

acquiring a first blur mapping signal corresponding to a dynamic forward movement of a target object in the photo to be blurred if it is determined that the blur adjustment signal locus is the dynamic short change to obtain a final virtual image-capturing state of the target object, and adjusting the target object to the virtual image-capturing state; and acquiring a second blur mapping signal corresponding to a dynamic backward movement of the target object in the photo to be blurred if it is determined that the blur adjustment signal locus is the dynamic long change to obtain the final virtual image-capturing state of the target object, and adjusting the target object to the virtual image-capturing state.

2. The method as claimed in claim 1, wherein before the step of receiving the virtual adjustment instruction for the photo to be blurred, and determining whether the blur adjustment signal locus corresponding to the virtual adjustment instruction is the dynamic short change or the dynamic long change, the instructions are adapted to be loaded and executed by the processor to further perform the following operation:

presetting that if the blur adjustment signal locus is the dynamic short change, the target object in the photo to be blurred is blurred so as to be dynamically highlighted forward, presetting that if the blur adjustment signal locus is the dynamic long change, the target object in the photo to be blurred is blurred so as to be dynamically highlighted backward.

3. The method as claimed in claim 2, wherein before the step of receiving the virtual adjustment instruction for the photo to be blurred, and determining whether the blur adjustment signal locus corresponding to the virtual adjustment instruction is the dynamic short change or the dynamic long change, the instructions are adapted to be loaded and executed by the processor to perform the following step:
generating a first virtual mapping electrical signal and a second virtual mapping electrical signal correspondingly at the same time when the blur adjustment signal locus corresponding to the virtual adjustment instruction is generated respectively based on virtual moving states of moving forward dynamically and moving backward dynamically of the target object.

4. The method as claimed in claim 3, wherein after the step of acquiring the first blur mapping signal corresponding to the dynamic forward movement of the target object in the photo to be blurred to obtain the final virtual image-capturing state of the target object, the instructions are adapted to be loaded and executed by the processor to further perform the following step:
sending a first virtual image-capturing request to a processor, the processor selecting a first virtual image-capturing control signal to control the target object to be adjusted to the virtual image-capturing state so as to perform image capture.

5. The method as claimed in claim 3, wherein in the step of generating the first virtual mapping electrical signal and the second virtual mapping electrical signal correspondingly at the same time when the blur adjustment signal locus corresponding to the virtual adjustment instruction is generated respectively based on the virtual moving states of moving forward dynamically and moving backward dynamically of the target object, the instructions are adapted to be loaded and executed by the processor to perform the following step:
sequentially outputting the first virtual mapping electrical signal that presents the dynamic short change or the second virtual mapping electrical signal that presents the dynamic long change based on a change of the blue adjustment signal locus.

6. The method as claimed in claim 5, wherein in the step of sending the first virtual image-capturing request to the processor, the processor selecting the first virtual image-capturing control signal to control the target object to be adjusted to the virtual image-capturing state so as to perform image capture, the instructions are adapted to be loaded and executed by the processor to perform the following step:
the processor selecting and directing the first virtual image-capturing control signal to a camera module of a terminal so as to control the camera module to perform a virtual highlighting image capture on the target object that has been adjusted to the virtual image-capturing state.

7. The method as claimed in claim 3, wherein after the step of acquiring the second blur mapping signal corresponding to the dynamic backward movement of the target object in the photo to be blurred to obtain the final virtual image-capturing state of the target object, the instructions are adapted to be loaded and executed by the processor to further perform the following step:
sending a second virtual image-capturing request to a processor, the processor selecting a second virtual image-capturing control signal to control the target object to be adjusted to the virtual image-capturing state so as to perform image capture.

8. The method as claimed in claim 7, wherein in the step of sending the second virtual image-capturing request to the processor, the processor selecting the second virtual image-capturing control signal to control the target object to be adjusted to the virtual image-capturing state so as to perform image capture, the instructions are adapted to be loaded and executed by the processor to perform the following step:
the processor selecting and directing the second virtual image-capturing control signal to the camera module of the terminal so as to control the camera module to perform a virtual highlighting image capture on the target object that has been adjusted to the virtual image-capturing state.

9. A storage device stored a plurality of instructions and connected to a camera of a mobile terminal, the plurality of instructions adapted to be loaded and executed by a processor to perform the following operations:
receiving a virtual adjustment instruction for a photo to be blurred, and determining whether a blur adjustment signal locus corresponding to the virtual adjustment instruction is a dynamic short change or a dynamic long change;
acquiring a first blur mapping signal corresponding to a dynamic forward movement of a target object in the photo to be blurred if it is determined that the blur adjustment signal locus is the dynamic short change to obtain a final virtual image-capturing state of the target object, and adjusting the target object to the virtual image-capturing state; and
acquiring a second blur mapping signal corresponding to a dynamic backward movement of the target object in the photo to be blurred if it is determined that the blur adjustment signal locus is the dynamic long change to obtain the final virtual image-capturing state of the target object, and adjusting the target object to the virtual image-capturing state.

10. A mobile terminal comprising:
a processor adapted to execute a plurality of instructions; and
a storage device communicatively connected to the processor, the storage device being adapted to store the plurality of instructions, the instructions being adapted to be loaded and executed by the processor to perform the following operations:
receiving a virtual adjustment instruction for a photo to be blurred, and determining whether a blur adjustment signal locus corresponding to the virtual adjustment instruction is a dynamic short change or a dynamic long change;
acquiring a first blur mapping signal corresponding to a dynamic forward movement of a target object in the photo to be blurred if it is determined that the blur adjustment signal locus is the dynamic short change to obtain a final virtual image-capturing state of the target object, and adjusting the target object to the virtual image-capturing state; and
acquiring a second blur mapping signal corresponding to a dynamic backward movement of the target object in the photo to be blurred if it is determined that the blur adjustment signal locus is the dynamic long change to obtain the final virtual image-capturing state of the target object, and adjusting the target object to the virtual image-capturing state.

11. The mobile terminal as claimed in claim 10, wherein before the operation of receiving the virtual adjustment instruction for the photo to be blurred, and determining whether the blur adjustment signal locus corresponding to the virtual adjustment instruction is the dynamic short change or the dynamic long change, the instructions are adapted to be loaded and executed by the processor to further perform the following operation:

presetting that if the blur adjustment signal locus is the dynamic short change, the target object in the photo to be blurred is blurred so as to be dynamically highlighted forward, presetting that if the blur adjustment signal locus is the dynamic long change, the target object in the photo to be blurred is blurred so as to be dynamically highlighted backward.

12. The mobile terminal as claimed in claim 10, wherein in the operation of acquiring the first blur mapping signal corresponding to the dynamic forward movement of the target object in the photo to be blurred if it is determined that the blur adjustment signal locus is the dynamic short change to obtain the final virtual image-capturing state of the target object, the instructions are adapted to be loaded and executed by the processor to perform the following operation:

determining that the photographed target object moves forward dynamically when the blur adjustment signal locus is the dynamic short change, each time the target object moving, a virtual mapping electrical signal mapping a current virtual state of the photographed target object in sequence, until the photographed target object dynamically moves forward N times to achieve the final virtual image-capturing state.

13. The mobile terminal as claimed in claim 10, wherein in the operation of acquiring the second blur mapping signal corresponding to the dynamic backward movement of the target object in the photo to be blurred if it is determined that the blur adjustment signal locus is the dynamic long change to obtain the final virtual image-capturing state of the target object, the instructions are adapted to be loaded and executed by the processor to perform the following operation:

determining that the photographed target object moves backward dynamically when the blur adjustment signal locus is the dynamic long change, each time the target object moving, a virtual mapping electrical signal mapping a current virtual state of the photographed target object in sequence, until the photographed target object dynamically moves backward N times to achieve the final virtual image-capturing state.

14. The mobile terminal as claimed in claim 11, wherein before the operation of receiving the virtual adjustment instruction for the photo to be blurred, and determining whether the blur adjustment signal locus corresponding to the virtual adjustment instruction is the dynamic short change or the dynamic long change, the instructions are adapted to be loaded and executed by the processor to perform the following operation:

generating a first virtual mapping electrical signal and a second virtual mapping electrical signal correspondingly at the same time when the blur adjustment signal locus corresponding to the virtual adjustment instruction is generated respectively based on virtual moving states of moving forward dynamically and moving backward dynamically of the target object.

15. The mobile terminal as claimed in claim 14, wherein after the operation of acquiring the first blur mapping signal corresponding to the dynamic forward movement of the target object in the photo to be blurred to obtain the final virtual image-capturing state of the target object, the instructions are adapted to be loaded and executed by the processor to further perform the following operation:

sending a first virtual image-capturing request to a processor, the processor selecting a first virtual image-capturing control signal to control the target object to be adjusted to the virtual image-capturing state so as to perform image capture.

16. The mobile terminal as claimed in claim 14, wherein in the operation of generating the first virtual mapping electrical signal and the second virtual mapping electrical signal correspondingly at the same time when the blur adjustment signal locus corresponding to the virtual adjustment instruction is generated respectively based on the virtual moving states of moving forward dynamically and moving backward dynamically of the target object, the instructions are adapted to be loaded and executed by the processor to perform the following operation:

sequentially outputting the first virtual mapping electrical signal that presents the dynamic short change or the second virtual mapping electrical signal that presents the dynamic long change based on a change of the blue adjustment signal locus.

17. The mobile terminal as claimed in claim 16, wherein in the operation of sending the first virtual image-capturing request to the processor, the processor selecting the first virtual image-capturing control signal to control the target object to be adjusted to the virtual image-capturing state so as to perform image capture, the instructions are adapted to be loaded and executed by the processor to perform the following operation:

the processor selecting and directing the first virtual image-capturing control signal to a camera module of a terminal so as to control the camera module to perform a virtual highlighting image capture on the target object that has been adjusted to the virtual image-capturing state.

18. The mobile terminal as claimed in claim 14, wherein after the operation of acquiring the second blur mapping signal corresponding to the dynamic backward movement of the target object in the photo to be blurred to obtain the final virtual image-capturing state of the target object, the instructions are adapted to be loaded and executed by the processor to further perform the following operation:

sending a second virtual image-capturing request to a processor, the processor selecting a second virtual image-capturing control signal to control the target object to be adjusted to the virtual image-capturing state so as to perform image capture.

19. The mobile terminal as claimed in claim 18, wherein in the operation of sending the second virtual image-capturing request to the processor, the processor selecting the second virtual image-capturing control signal to control the target object to be adjusted to the virtual image-capturing state so as to perform image capture, the instructions are adapted to be loaded and executed by the processor to perform the following operation:

the processor selecting and directing the second virtual image-capturing control signal to the camera module of the terminal so as to control the camera module to perform a virtual highlighting image capture on the target object that has been adjusted to the virtual image-capturing state.

\* \* \* \* \*